United States Patent [19]

Wagner

[11] Patent Number: 4,536,001
[45] Date of Patent: Aug. 20, 1985

[54] MOTORCYCLE CARGO TRAILER

[76] Inventor: Robert E. Wagner, Rte. 1, Box 34, Farmington, Wash. 99128

[21] Appl. No.: 460,166

[22] Filed: Jan. 24, 1983

[51] Int. Cl.³ .......................... B60P 3/24; B62K 27/00
[52] U.S. Cl. ...................................... 280/5 C; 280/65; 280/204
[58] Field of Search .................. 280/204, 63, 65, 701, 280/485, 486, 483, 492, 5 E, 5 C, 5 F, 504

[56] References Cited

U.S. PATENT DOCUMENTS

| | | | |
|---|---|---|---|
| 2,513,932 | 7/1950 | Grube | 280/485 |
| 3,012,796 | 12/1961 | Mieding | 280/204 |
| 3,281,161 | 10/1966 | Anderson | 280/486 |
| 3,840,085 | 10/1974 | Smith | 280/204 X |
| 3,935,606 | 2/1976 | Soot | 280/701 X |
| 4,077,646 | 3/1978 | Watkins | 280/204 |
| 4,342,467 | 8/1982 | Kester | 280/204 |

FOREIGN PATENT DOCUMENTS

| | | | |
|---|---|---|---|
| 613436 | 1/1961 | Canada | 280/63 |
| 1543727 | 9/1968 | France | 280/5 E |

Primary Examiner—John A. Pekar
Attorney, Agent, or Firm—Wells, St. John & Roberts

[57] ABSTRACT

Disclosed is a motorcycle cargo trailer having a low profile and constructed with a swing arm suspension system which allows it to travel close to the road with a low center of gravity. Air adjustable shock absorbers are provided to support the suspension swing arms. The wheels of the trailer are enclosed within wheel wells to reduce splash of water and mud from the wheels. The trailer tongue is adjustable for varying heights of motorcycles. The trailer includes a reservoir which is formed within structural components of the unibody structural system. A hitch system which reduces vibration and prevents trailer sway even at high speeds is also shown.

4 Claims, 6 Drawing Figures

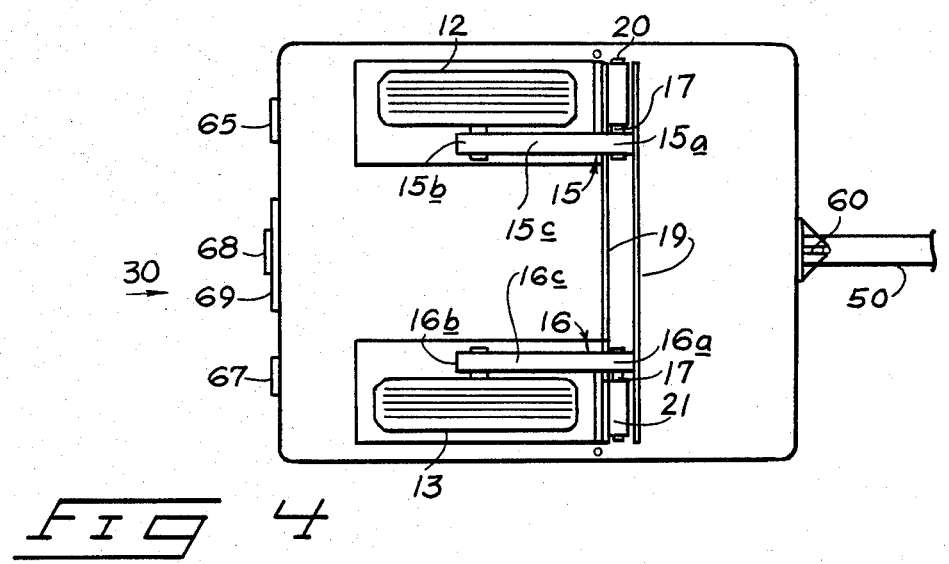
FIG. 4
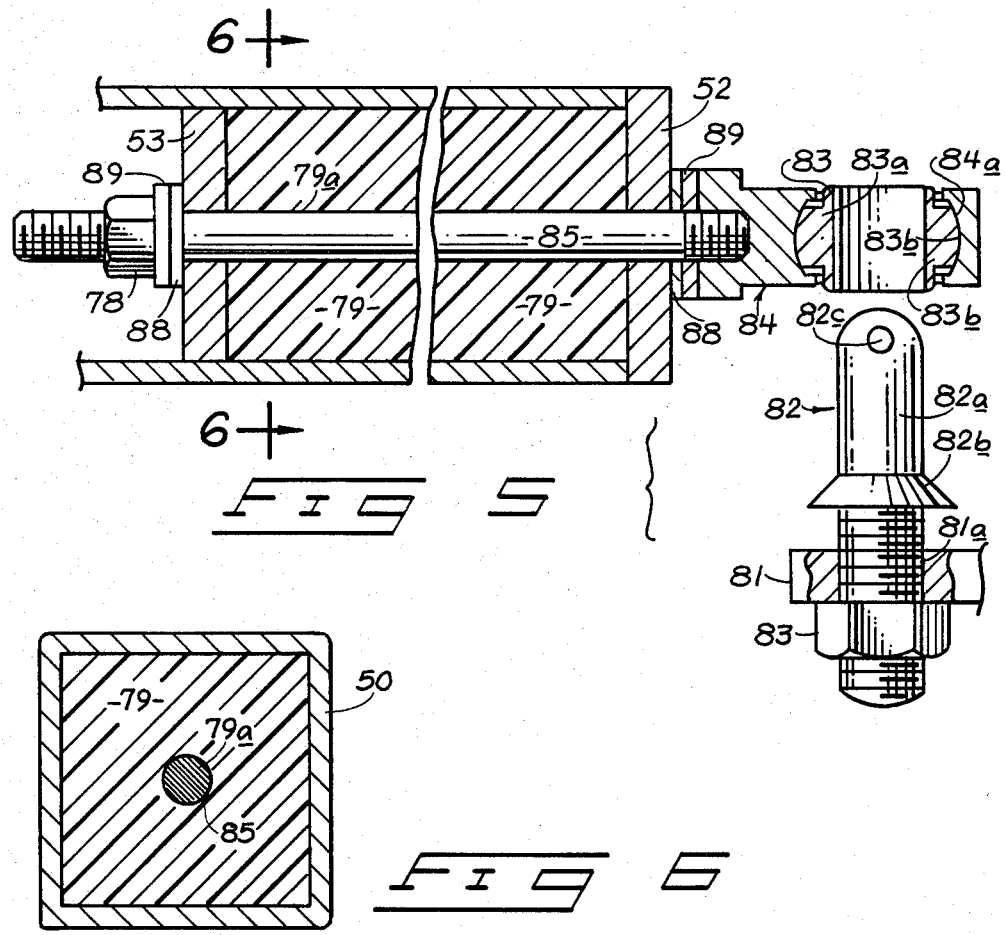
FIG. 5
FIG. 6

MOTORCYCLE CARGO TRAILER

TECHNICAL FIELD

The technical field of this invention is cargo trailers for motorcycles or other tandem two-wheeled vehicles.

BACKGROUND OF THE INVENTION

Most prior art cargo trailers for motorcycles have a transverse axle supported by two wheels. A cargo container is usually supported upon the axle using coil or leaf springs. In most cases a frame is also included between the container and axle. A tongue is provided at the front of the cargo trailer for hitching the trailer to the rear of the motorcycle. Such prior art trailers suffer from several limitations which will be considered below.

One of the chief problems with prior art motorcycle trailers is the relatively rough ride. Rough riding trailers tend to jerk and pull the motorcycles as they go over bumps in the road. The additional vibrations and forces applied to the motorcycle can cause failure of motorcycle parts and also diminishes the pleasure of riding the motorcycle. Rough riding trailers are also hard on the trailer contents.

The usual transverse axle and spring suspension arrangement used in prior art cargo trailers resulted in the trailers having a high center of gravity. A high center of gravity causes additional sway both from side to side during cornering and from front to back during acceleration and braking. This diminishes the road handling ability of the trailer and motorcycle. High profile trailers also have large aerodynamic drag, substantial sway from cross winds, and restrict the operator's rear visibility. Splash from the wheels of a high profile trailer usually requires that mud flaps or splashguards be used.

High profile trailers usually have high hitches. When motorcycles lean on corners the tilt of the motorcycle causes the high hitch and tongue to swing, thereby causing a steering effect which steers the trailer in the direction of the turn. High profile trailers often have an excessive steering effect. The high hitches also cause poor handling when simultaneously turning and backing.

Many of the prior art motorcycle trailers also suffer from poor aerodynamic efficiency because of their relatively large wind profile and complicated drag inducing shapes.

Many prior art motorcycle trailers did not provide sufficient structural strength to protect the cargo in case of collision with another vehicle or stationary objects.

Many prior art motorcycle trailers were not capable of tracking along a truly straight line at high rates of speed. This lack of tracking ability may have been caused or contributed to by the hitch system, suspension system, or aerodynamic performance of the overall cargo trailer.

Another problem with prior art motorcycle trailers was that the hitch system did not allow the motorcycle to be laid over on its side without applying torque to the trailer. The torque applied to the trailer tended to lift one or the other of the wheels off the ground and placed the trailer and motorcycle in positions where they were bound by each other subjecting each to forces and torques which were undesirable.

Prior art trailers did not incorporate a means for adjusting their suspension systems for heavier or lighter cargo. Prior art trailers also did not provide additional fuel capacity which could be coupled to the motorcycle fuel system and be used during travel.

The current invention is directed to solving the above problems and other problems using the structure and function of the invention described below.

BRIEF DESCRIPTION OF THE DRAWINGS

A preferred embodiment of the invention is illustrated in the accompanying drawings in which:

FIG. 4 is a bottom view of the trailer;

FIG. 5 is an enlarged cross-sectional view of the hitch system; and

FIG. 6 is a cross-sectional view taken along line 6—6 of FIG. 5.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 1:
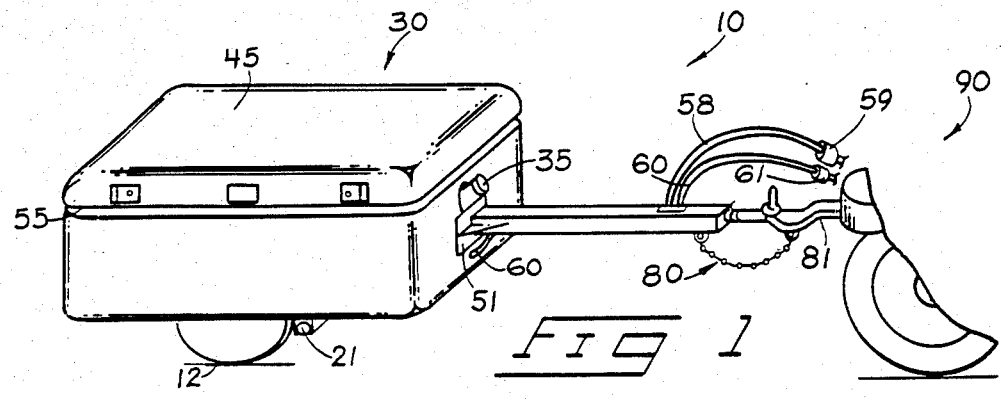
FIG. 1 is a perspective view of the motorcycle cargo trailer of this invention connected to a motorcycle.

FIG. 1 shows a perspective view of a motorcycle cargo trailer according to this invention. The cargo trailer generally referred to by the reference numeral 10 is connected to a motorcycle 90 by a hitch system 80. Trailer 10 has a trailer body 30 which is supported upon right wheel 12 and left wheel 13. Wheels 12 and 13 are rotatably mounted on swing arm assemblies 15 and 16 (see FIG. 4) to trailer body 30. The first ends 15a and 16a of swing arm assemblies 15 and 16 have first axles 17 which are pivotally mounted to the trailer body 30 in front of the wheels by bearings 20 and 21. Bearings 20 and 21 are preferably a set of two tapered roller bearings mounted in opposed fashion to securely hold the swing arm assembly to the trailer body 30. Bearings 20 and 21 are connected to the trailer body 30 within a channel member 19 which extends across the bottom 44 of the trailer body.

At the second ends 15b and 16b of swing arm assemblies 15 and 16 are second axles 18. Wheels 12 and 13 are rotatably mounted upon the second axles 18 using suitable bearings (not shown). The swing arm assemblies 15 and 16 have a U-shaped configuration which aligns the bearings 20 and 21 with the wheels 12 and 13. The swing arms axles 17 and 18 are relatively short, thereby minimizing torsional loading of the swing arms 15c and 16c and maintaining good alignment of the wheels 12 and 13 with the trailer and each other to minimize tire wear and rolling resistance. The swing arm suspension system also aids in making the trailer have good road handling ability and to track straight behind the motorcycle even at high speeds.

Figure 2:
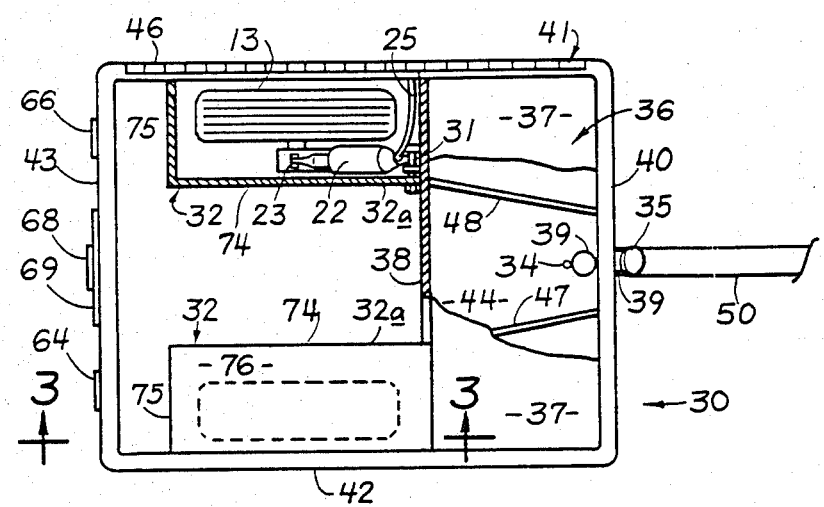
FIG. 2 is a top view of the trailer with the top cover removed and with portions broken away and shown in cross section.
Figure 3:
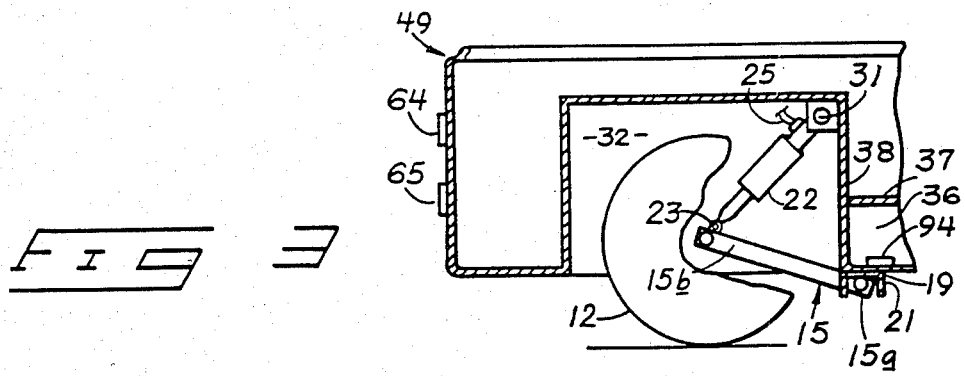
FIG. 3 is a partial cross-sectional view taken along line 3—3 of FIG. 1.

The swing arm assemblies 15 and 16 are stabilized vertically and horizontally using biasing and shock absorbing means 22 attached near the second ends 15b and 16b of swing arms 15 and 16 at pivotal connections 23 (see FIGS. 2 and 3). The opposite end of the biasing and shock absorbing means 22 are attached to the trailer body 30 at pivotal connections 31 in the forward upper corner of wheel wells 32.

The biasing and shock absorbing means 22 are preferably shock absorbers which can be adjusted by pressurizing or depressurizing with compressed air. Such shock absorbers are commonly referred to as "air shocks" 11 and are readily available from a wide number of manufacturers. Biasing and shock absorbing means 22 are supplied with compressed air through flexible tubes 25 which have their distal end securely mounted to trailer body 30 at a point which is easily accessible for adjustment.

The suspension system just described provides a very smooth and stable ride while allowing the trailer body 30 to travel lower to the ground than prior art trailers. This low profile reduces sway, pitch and aerodynamic drag including crosswind effects.

The trailer is a unit body design which does not have any separate chassis or frame. This eliminates the prior art chassis interspaced between the trailer body and the suspension system, thereby significantly reducing the height of both the trailer and its center of gravity. The unit body design has a cumulative effect with the swing arm suspension system in keeping the trailer profile and center of gravity as low as possible.

Trailer body 30 has a front wall 40, rear wall 43, left wall 41, right wall 42, bottom 44 and top 45. Top 45 is mounted to left wall 41 preferably using a piano hinge 46 (FIG. 2). Left and right walls 41 and 42 extend fully along the sides without cutouts for wheels 12 and 13. This full sided construction is a very important safety feature by preventing a colliding vehicle or stationary object from catching on the trailer. The full sided construction also minimizes wind resistance and reduces splash from the wheels.

Trailer body 30 has an interior cargo compartment which extends between front and rear walls 40 and 43 and between left and right sidewalls 41 and 42. The cargo compartment extends downwardly to bottom 44 except at wheels wells 32 and reservoir 36. As FIG. 3 shows quite clearly, the cargo compartment is very low to the ground in relationship to the wheels 12 and 13. This keeps the center gravity and profile of the trailer very low and efficiently uses all available space.

Corners of trailer body 30 are rounded by using a compound bend method of forming the sheet metal. The compound bend corners provide greater structural rigidity and reduced wind resistance. The rounded corners also help to more effectively deflect colliding vehicles.

The structural rigidity of trailer body 30 is greatly improved by interconnecting several key parts in the arrangement which will now be described. The wheel wells 32 are bounded along the outside by the left and right side walls 41 and 42. A bulkhead 38 extends across the interior of the trailer body. Bulkhead 38 is welded to the bottom 44 and extends upwardly therefrom. Bulkhead 38 extends upwardly at the front of wheel wells 32 so as to form the front wall of the wheel wells. Wheel well interior side walls 74 extend rearwardly from bulkhead 38 and are welded to bottom 44. Wheel wells 32 also have rear walls 75 and tops 76 which completely divide the wheel wells from the interior cargo compartment of the trailer body. Wheel wells 32 provide very strong connections to left and right sidewalls 41 and 42 for supporting bulkhead 38. Wheel wells 32 also provide a beam effect which generally adds great structural rigidity to the trailer body both longitudinally and transversely.

Bulkhead 38 is attached to the bottom 44 immediately above the channel 19 which extends across the underside of bottom 44. Bulkhead 38 also forms the rear wall for a fuel reservoir 36 which extends forwardly from the bulkhead to the front wall 40 and between left and right sidewalls 41 and 42. The bottom of reservoir 36 is also trailer body bottom 44 to keep the fuel as low as possible, thereby keeping the center of gravity low.

Reservoir 36 has a top plate 37 which extends between front wall 40 and bulkhead 38. Top plate 37 is connected by bulkhead 38 to wheel well interior walls 74 thereby providing excellent structural rigidity for front wall 40. Top plate 37 is further supported by welding it to side walls 41 and 42. Top plate 37 is preferably welded to wheel well bulkhead 38, side walls 41 and 42 and front wall 40 thereby making a leakproof and structurally sound connection.

Reservoir 36 is preferably provided with anti-slosh baffles 47 and 48. Anti-slosh baffles 47 and 48 are connected to bulkhead 38 immediately in front of wheel well interior walls 74 and extend forwardly to connect with front wall 40. Anti-slosh baffles 47 and 48 angle inwardly from interior walls 74 to the wheel wells to near the connection point of tongue 50 to front wall 40. This arrangement for baffles 47 and 48 adds great structural rigidity for front wall 40 and specifically reinforces the area of maximum stress where the tongue is connected. Baffles 47 and 48 extend upwardly from bottom 44 to top plate 37 of the reservoir thereby providing additional support for top plate 37 and effectively forming the wheel wells and reservoir into a truss which makes the front wall 40 extremely strong.

Anti-slosh baffles 47 and 48 also prevent fuel from sloshing from side-to-side as the trailer turns. This improves the trailers cornering ability significantly. Holes 94 are provided in baffles 47 and 48 so that fuel can flow between the chamber of reservoir 36.

Fuel reservoir 36 is filled, using reservoir fill tube 39 which preferably has a locking cap 35. A vent tube 34 is provided for faster filling of reservoir 36. Fuel is drawn from reservoir 36 via a fuel line 60 which runs to the trailer hitch 80 and is there connected to the motorcycle fuel system through a commonly available quick connect coupling 61.

Front, left, right and rear walls 40 and 43, respectively, are provided with a sealing lip 49 which runs around the perimeter of the trailer body (FIG. 3). Top 45 is preferably provided with a resilient seal 55 (FIG. 1) which seals adjacent to the sealing lip 49 to prevent any leakage of water into trailer body 30.

The rear wall 43 of the trailer body is provided with taillights 64 - 68, and a bracket 69 for mounting a license plate.

Trailer body 30 is connected to the motorcycle using trailer tongue 50. Tongue 50 has a tongue mounting plate 51 (FIG. 1) which is preferably mounted to trailer front wall 40 using a four bolt connection pattern. Mounting plate 51 is preferably asymetrically connected to tongue 50 so that the tongue can be removed and turned over one half turn and remounted thereby providing two different tongue heights for varying sizes of motorcycles.

Tongue 50 is preferably constructed of a hollow, structural tube which allows the fuel line 60 and electrical cable 58 to run therethrough. Electrical cable 58 is connected to the motorcycle electrical system through connector 59.

Trailer 10 is preferably provided with a hitching system 80 which allows the trailer to swivel or move torsionally with respect to the longitudinal axis of the motorcycle. FIG. 5 shows an enlarged cross-sectional view of the hitching system 80. Motorcycle hitch bracket 81 is provided with a hitch pin 82 using a threaded opening 81a and a jam nut 83. Hitch pin 82 has a cylindrical section 82a and a frustoconical section 82b. Frustoconical section 82b allows the trailer 10 and motorcycle 90 to pitch and swivel relative to each other about a transverse horizontal axis without the hitch binding.

Cylindrical portion 82a of hitch pin 82 is positioned within the cylindrical bore 83a of inner race 83. Inner race 83 forms a part of connection head 84. Inner race 83 is pivotally and rotatably supported in connection head 84 in a ball 83b and socket 84a type arrangement.

Connection head shaft 85 extends through the tongue front end wall 52 and the tongue intermediate wall 53. Nylon washers 88 are provided at each end of connection head 84 to facilitate swivel action of the connection head 84 with respect to tongue 50. Backup washers 89 are also provided at each end of the connection head shaft 85. Nut 78 is used at the rearward end of connection head shaft 85 to secure the connection head 84 to tongue 50. The connection head 84 is threaded onto the connection head shaft 85 at the forward end.

A sleeve unit 79 is mounted within tongue 50 between front end wall 52 and intermediate wall 53. Elastomeric unit 79 is preferably made from polytetrafluoroethylene, polypropylene, or similar materials and is provided with a cylindrical hole 79a which has an inside diameter which is approximately the same size as the outside diameter of connection head shaft 85. Connection head shaft 85 is cylindrical and extends through the sleeve unit 79 in close contact therewith so that the connection head 84 is secured against up-and-down and side-to-side motion. Elastomeric unit 79 also stabilizes connection head 84 and prevents vibration. Friction between shaft 85 and sleeve unit 79 dampens the relative rotation between connection head 84 and tongue 50 to further stabilize the hitch system from vibration and unwanted wandering of the trailer. The sleeve unit also supports the connection head shaft 85 and prevents it from wearing against tongue 50 thereby preventing looseness from developing and causing the trailer to wander. Lubrication, tightening or other adjustment is therefore not necessary to keep the connection head 84 snugly mounted to tongue 50.

The trailer 10 is used by driving motorcycle 90 to the front end of the trailer. The motorcycle must be equipped with the hitch pin 82. The trailer tongue 50 is then lifted off the ground and positioned so that hitch pin 82 is inserted into cylindrical bore 83a of connection head 84. A lock (not shown) can then be installed through hole 82c to prevent theft of thetrailer.

Fuel line 60 and electrical cable 58 are then connected to motorcycle 90 using coupling 61 and connector 59. The trailer is then ready to be loaded and towed.

The trailer body 30 is preferably made from a high grade marine aluminum such as ASTM alloy 5086 to resist corrosion and to minimize the trailer weight. Tongue 50 is also preferably made of such an aluminum alloy. Trailer body 30 and the remainder of the trailer could alternatively be made of either metal or polymer materials, as is well-known in the art of vehicle design.

The trailer is manufactured according to well-known metal working and manufacturing techniques.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A motorcycle cargo trailer for use behind a motorcycle or other tandem two-wheeled vehicle comprising:
    a trailer body;
    left and right suspension swing arm assemblies having first and second ends; the first end of the swing arm assemblies being pivotally mounted to the trailer;
    left and right wheels rotatably mounted to the second ends of the left and right swing arm assemblies; the left and right wheels being enclosed within wheel wells which are within the trailer body;
    biasing and shock absorbing means pivotally connected at one end to the left and right swing arm assemblies and at the other end pivotally connected to the trailer body; and
    a fuel reservoir at the front of the trailer body; said fuel reservoir having a top plate which connects with and extends from a front wall of the trailer body to the wheel wells at each side and from a left side wall to a right side wall of the trailer body to form an integral part of the trailer body structure; said top plate connecting with the wheel wells below a top of the wheel well.

2. The motorcycle cargo trailer of claim 1 further comprising a tongue connected to the front wall of the trailer body near the connection between the front wall and the reservoir top plate.

3. The motorcycle cargo trailer of claim 2 wherein the tongue is provided with a mounting plate which is asymmetrically connected thereto so that the tongue can be mounted on the trailer in two different orientations by rotating the tongue one-half turn to provide two different tongue heights.

4. A motorcycle cargo trailer for use behind a motorcycle or other tandem two-wheeled vehicle comprising:
    a trailer body;
    left and right suspension swing arm assemblies having first and second ends; the first end of the swing arm assemblies being pivotally mounted to the trailer;
    left and right wheels rotatably mounted to the second ends of the left and right swing arm assemblies; the left and right wheels being enclosed within wheel wells which are within the trailer body;
    biasing and shock absorbing means pivotally connected at one end to the left and right swing arm assemblies and at the other end pivotally connected to the trailer body; and
    wherein said left and right suspension swing arm assemblies further comprise first axles connected at first ends thereof, and second axles connected at second ends thereof; said first and second axles extending from the same side of the swing arm assemblies in a U-shaped configuration; said first axles being pivotally mounted to the trailer body at a position forward of the wheels; said second axles having said wheels rotatably mounted thereon.

* * * * *